United States Patent
Metral et al.

(10) Patent No.: US 11,049,096 B2
(45) Date of Patent: Jun. 29, 2021

(54) FAULT TOLERANT TOKEN BASED TRANSACTION SYSTEMS

(71) Applicant: PAYPAL, INC., San Jose, CA (US)

(72) Inventors: Max Metral, San Jose, CA (US);
Douglas Hurst, San Jose, CA (US);
Kevin Laracey, San Jose, CA (US);
Suzanne Lenox, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 728 days.

(21) Appl. No.: 14/986,416

(22) Filed: Dec. 31, 2015

(65) Prior Publication Data

US 2017/0193498 A1   Jul. 6, 2017

(51) Int. Cl.
*G06Q 40/00* (2012.01)
*G06Q 20/36* (2012.01)
*G06Q 20/40* (2012.01)
*G06Q 20/32* (2012.01)

(52) U.S. Cl.
CPC ............ *G06Q 20/36* (2013.01); *G06Q 20/32* (2013.01); *G06Q 20/401* (2013.01); *G06Q 20/405* (2013.01); *G06Q 20/4033* (2013.01)

(58) Field of Classification Search
CPC ...... G06Q 20/36; G06Q 20/32; G06Q 20/401; G06Q 20/4033; G06Q 20/405
See application file for complete search history.

(56) References Cited

U.S. PATENT DOCUMENTS

| | | |
|---|---|---|
| 5,739,512 A | 4/1998 | Tognazzini |
| 7,040,533 B1 | 5/2006 | Ramachandran |
| 7,379,921 B1 | 5/2008 | Kiliccote |
| 7,483,858 B2 | 1/2009 | Foran et al. |
| 7,798,394 B2 * | 9/2010 | Hill ................ G06K 7/0008 235/375 |
| 7,992,776 B1 | 8/2011 | Ramachandran et al. |
| 2003/0004737 A1 | 1/2003 | Conquest et al. |
| 2003/0110717 A1 | 6/2003 | Rodriguez |
| 2003/0126064 A1 | 7/2003 | Foran et al. |

(Continued)

FOREIGN PATENT DOCUMENTS

| | | |
|---|---|---|
| EP | 1264259 | 2/2007 |
| JP | 2002032686 | 1/2002 |

(Continued)

OTHER PUBLICATIONS

"Bill Paying by Mobile Phone Using Barcode Capture", News Releases in 2006, Nov. 8, 2006, 4 pages, Global IT Innovator: NTT Data Group, Toyusu, Japan.

*Primary Examiner* — Rajesh Khattar
(74) *Attorney, Agent, or Firm* — Haynes and Boone, LLP (57) ABSTRACT

Methods and systems for fault tolerant token based transactions are described. A user may perform a transaction with a mobile device. The mobile device may be in an offline mode or may be lacking a network connection to servers or cloud devices of a mobile payment system. The transaction may be processed through a transaction device, which may aid in the sending and receiving of transaction data while the mobile device is in the offline mode. The transaction device may communicate with the server or cloud device and the server or cloud device may process the transaction and communicate with the transaction device, which may forward data from the server or cloud device to the mobile device.

20 Claims, 7 Drawing Sheets

(56) References Cited

U.S. PATENT DOCUMENTS

| | | | |
|---|---|---|---|
| 2005/0136884 A1* | 6/2005 | Reidelsturz | H04H 20/57 455/403 |
| 2005/0203854 A1 | 9/2005 | Das et al. | |
| 2006/0105742 A1 | 5/2006 | Kim et al. | |
| 2006/0206709 A1 | 9/2006 | Labrou et al. | |
| 2007/0219752 A1* | 9/2007 | Aoyama | G06Q 10/00 702/187 |
| 2007/0295805 A1 | 12/2007 | Ramachandran | |
| 2008/0034221 A1 | 2/2008 | Hammad et al. | |
| 2008/0048022 A1 | 2/2008 | Vawter | |
| 2008/0133351 A1 | 6/2008 | White et al. | |
| 2008/0222048 A1* | 9/2008 | Higgins | G06Q 20/4012 705/67 |
| 2009/0063312 A1 | 3/2009 | Hurst | |
| 2009/0164375 A1* | 6/2009 | Saunders | G06Q 20/385 705/44 |
| 2009/0254479 A1 | 10/2009 | Pharris | |
| 2010/0017327 A1 | 1/2010 | Treadwell et al. | |
| 2010/0070537 A1* | 3/2010 | Amidon | G06F 17/30038 707/802 |
| 2010/0125510 A1 | 5/2010 | Smith et al. | |
| 2011/0055084 A1 | 3/2011 | Singh | |
| 2011/0066550 A1 | 3/2011 | Shank et al. | |
| 2011/0191252 A1 | 8/2011 | Dai | |
| 2011/0231238 A1 | 9/2011 | Khan et al. | |
| 2011/0238573 A1 | 9/2011 | Varadarajan | |
| 2011/0251892 A1 | 10/2011 | Laracey | |
| 2012/0022973 A1* | 1/2012 | Makhotin | G06Q 20/327 705/27.1 |
| 2012/0187187 A1 | 7/2012 | Duff et al. | |
| 2012/0203700 A1 | 8/2012 | Ornce et al. | |
| 2013/0054336 A1 | 2/2013 | Graylin | |
| 2013/0110654 A1 | 5/2013 | Kobres | |
| 2013/0110676 A1 | 5/2013 | Kobres | |
| 2013/0110717 A1 | 5/2013 | Kobres | |
| 2013/0110727 A1 | 5/2013 | Kobres | |
| 2013/0110728 A1 | 5/2013 | Kobres | |
| 2013/0117862 A1* | 5/2013 | Farrell | H04L 12/22 726/29 |
| 2013/0124411 A1 | 5/2013 | Kobres et al. | |
| 2013/0132234 A1 | 5/2013 | Grossi et al. | |
| 2013/0179285 A1 | 7/2013 | Lyle | |
| 2013/0179352 A1* | 7/2013 | Dwyre | G06Q 20/20 705/71 |
| 2013/0311313 A1 | 11/2013 | Laracey | |
| 2015/0112870 A1* | 4/2015 | Nagasundaram | G06Q 20/3821 705/67 |
| 2015/0186883 A1* | 7/2015 | Song | G06Q 20/401 705/44 |
| 2015/0339318 A1* | 11/2015 | O'Toole | G06Q 20/223 705/40 |
| 2016/0012430 A1* | 1/2016 | Chandrasekaran | G06Q 20/385 705/44 |
| 2016/0292668 A9 | 10/2016 | Laracey | |
| 2016/0328692 A1* | 11/2016 | Camps | G06Q 20/204 |
| 2017/0161723 A1* | 6/2017 | Hill | G06K 7/0008 |
| 2017/0200149 A1* | 7/2017 | Antunovic | G06Q 20/4018 |
| 2017/0206519 A1* | 7/2017 | Taveau | G06Q 20/32 |
| 2018/0232732 A1* | 8/2018 | Rodrigues | G06Q 20/223 |
| 2018/0322497 A1* | 11/2018 | Lewis | G06Q 20/3278 |
| 2019/0132134 A1* | 5/2019 | Noe | H04L 9/3263 |

FOREIGN PATENT DOCUMENTS

| | | |
|---|---|---|
| JP | 2002109421 | 4/2002 |
| JP | 2003141402 | 5/2003 |
| JP | 2003521028 | 7/2003 |
| JP | 2004246536 | 9/2004 |
| JP | 2004326348 | 11/2004 |
| JP | 2005092338 | 4/2005 |
| JP | 2005157426 | 6/2005 |
| JP | 2005276023 | 10/2005 |
| JP | 2006099713 | 4/2006 |
| JP | 2006243842 | 9/2006 |
| JP | 2006277715 | 10/2006 |
| JP | 2007034941 | 2/2007 |
| JP | 2007299316 | 11/2007 |
| JP | 2008129787 | 6/2008 |
| JP | 2008217277 | 9/2008 |
| JP | 2008242828 | 10/2008 |
| JP | 2009080729 | 4/2009 |
| JP | 2039276833 | 11/2009 |
| KR | 20060084520 | 7/2006 |
| KR | 20100018744 | 2/2010 |
| KR | 20110039946 | 4/2011 |
| WO | WO0163546 | 8/2001 |
| WO | WO2008153096 | 12/2008 |
| WO | WO2010035224 | 4/2010 |
| WO | WO2010125577 | 11/2010 |

* cited by examiner

FAULT TOLERANT TOKEN BASED TRANSACTION SYSTEMS

BACKGROUND

Field of the Invention

The present invention generally relates to tokenized transactions, and more particularly to using an electronic wallet to process an in-person transaction.

Related Art

Increasingly, mobile phones may be used to conduct electronic transactions. However, conventional mobile transaction systems and schemes generally suffer from a number of problems, including network failures or unavailability resulting in an inability to communicate needed information for a transaction.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that facilitate transactions using mobile wallets. The present disclosure describes some embodiments where a mobile device may be used to initiate or aid in the processing of a transaction at a merchant location such as with an automated teller machine, a payment kiosk, a check-out counter, point of sale (POS) device, or the like, using a mobile wallet. The present disclosure describes embodiments where a mobile device may be used to obtain a checkout token for use in a transaction where the token is wirelessly communicated to a merchant for use in a transaction. In certain embodiments, the token may be obtained before the transaction is initiated. The techniques described herein may be performed with communication between the mobile device and the merchant location through any wireless communication techniques including, for example, Bluetooth and other Bluetooth standard protocols such as Bluetooth Low Energy, Wi-Fi, Near Field Communications (NFC), Quick Response (QR) codes, bar codes, scanning of other codes, wired data transmission, and other communication techniques. It is understood that though certain embodiments may be described as being performed with one or a plurality of communication techniques, such description is illustrative and is not limiting of possible communication modes.

The advent of the internet has allowed mobile phones or other mobile devices (e.g., tablets, laptops, personal data assistants, and/or wearable electronic devices) to be used as payment devices. Users may pay for goods or services using electronic mobile wallets. Such mobile wallets may be at least partially contained within a server (e.g., the internet cloud), and accessible from the mobile device via the internet. In some embodiment, when the user pays for goods or services (or otherwise conducts a transaction) using the mobile wallet, the electronic device may transmit a token to the server through, for example, wireless communication, scanning of a graphic displayed on the electronic, and/or through another manner. The server may receive the token and process the transaction according to the token received. However, the mobile device may be disconnected from the internet in certain instances, which may prevent the transaction from being processed. The present invention may allow the processing of the transaction while the mobile device is disconnected from the internet, resulting in advantages including the user being able to conduct a transaction (such as purchasing and receiving goods or services), the merchant being able to make a sale, and the service or wallet provider being able to obtain revenue from the transaction.

Figure 1:
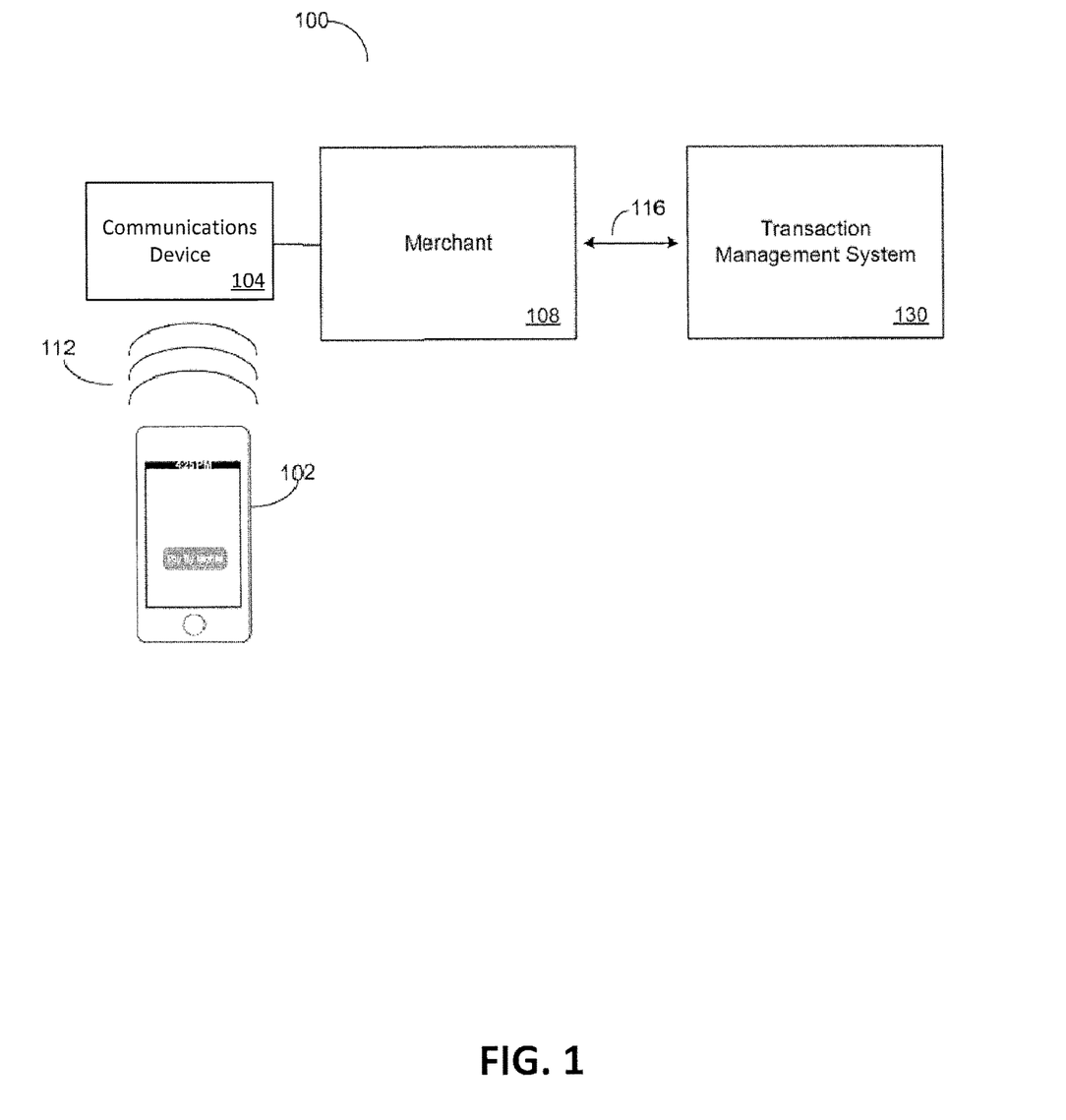
FIG. 1 is a block diagram showing a payment system according to an embodiment of the disclosure.

The present invention may be performed with certain payment systems. FIG. 1 is a block diagram showing a payment system according to an embodiment of the disclosure. FIG. 1 includes a mobile device 102, a communications device 104, a merchant 108, and a transaction management system 130. The mobile device 102 may be connected to a communications device 104 via a communication path 112. The communications device 104 is connected to a merchant 108. The merchant 108 may be in communication with one or more payment networks 116. The payment network 116 may allow direct or indirect communication to the transaction management system 130.

A mobile wallet payment account holder, buyer, user, or operator (the "customer" or the "user") may have, use, or operate the mobile device 102. The mobile device 102 may be, for example, a smartphone, a personal data assistant, a tablet, a wearable electronic device (such as a smartwatch or electronically augmented glasses), a laptop, or other electronic device. The mobile device 102 may include a user interface that includes a combination of one or more of a display screen, a data entry device such as a keypad or touch screen, buttons, facial or movement recognition abilities, or other items allowing a user to interface with the mobile device 102. The user may use the mobile device 102 to conduct a transaction with the merchant 108.

The communications device 104 may be, for example, part of a point of sale terminal or point of transaction. The point of sale terminal or point of transaction may be a kiosk, an automated teller machine, a checkout machine, a mobile device, a scanner, or another device that allows a user or customer to purchase, check out, and/or pay for items. The merchant may be a physical store, an electronic commerce merchant, a mail order and/or telephone merchant, an individual, a pending machine, kiosk, or other unattended device, or another individual or entity that offers products or services for sale. The communications device 104 may allow communications (e.g., between the merchant 108 and the mobile device 102) over various communications protocols, such as Bluetooth, Bluetooth Low Energy (BLE), WiFi, NFC, QR codes, bar codes, scanning of other codes, wired data transmission, and other communication techniques.

As shown in FIG. 1, the merchant 108 may be in communication with one or more payment networks 116. The transaction management system 130 may include one or more servers that may, for example, include a hard drive or other storage device that may store data associated with the mobile wallets of account holders. Such data may be, for example, account identifiers or account numbers, user information such as name, contact information (e.g., phone numbers, e-mails, social media accounts, messaging service accounts, or other contact information), contact preferences, account information (e.g., bank account information, balance information, credit card numbers, expiration dates, or PIN numbers), and account balance, information on the location of the user (such as where the user has been), and other information associated with the account holder. The transaction management system 130 may process transactions carried out between the mobile device 102 and the merchant 108 by, for example, confirming payment associated with the transaction and transferring funds from the user's account to that of the merchant's account.

In some embodiments, the communication between a merchant 108 and one or more payment networks 116 may be direct or indirect communication. Direct communication may be communication where the merchant 108 is directly in contact with one or more servers of the transaction management system 130. Indirect communication may be communication where the merchant 108 is in communication with one or more servers of the transaction management system 130 via one or more intermediaries such as merchant processors or gateway providers.

In an illustrative example, a user operating the mobile device 102 may approach a point of transaction to conduct a transaction. The user may interact with a payment application on the mobile device 102 to initiate the transaction. The user may select to pay with a mobile wallet account by selecting a mobile wallet payment option displayed or communicated to the user on the mobile device 102 or by performing an action such as a tapping the mobile device 102 on a terminal or payment device of the merchant 108. The payment application may then, in certain embodiments, optionally prompt the user to authenticate themselves through the entry of a password (either character based and/or action based, such as by performing a series of movements with the finger of the user), a fingerprint scan, an iris scan, a voiceprint authentication, or other authentication technique.

After authentication, the mobile device 102 may then continue the transaction by passing one or more checkout tokens, as well as other data associated with the transaction, to the communications device 104 via the communication path 112. In certain embodiments, the checkout token may be a token previously obtained by the transaction management system 130. For example, the checkout token may have been obtained by the mobile device 102 when the mobile device previously had a network connection to the transaction management system 130 (e.g., before the mobile device 102 was placed in an "offline mode" or lost connection to the transaction management system). The checkout token may be, for example, a transaction identifier, an account identifier, a session identifier, a wallet identifier, a user identifier, or the like. In some embodiments, the checkout token may be formatted such that it may be processed or routed using the payment network 116 via the communication path 112. The checkout tokens may be configured so that the mobile device 102 may store or cache the checkout token for use at a later transaction.

In some embodiments, the checkout token may be combined with other transaction data by the merchant 108 into a payment authorization request. The merchant 108 may then transmit the payment authorization request to the payment network 116 (to be processed and/or delivered to the transaction management system 130). The merchant 108, in other embodiments, may send the token in one message and other data associated with the transaction in other message(s). The merchant 108 in yet other embodiments may only send the checkout token to the payment network 116. In some embodiments, the merchant, processor or other entity may add additional information to the request message including, for example, a merchant identifier, a terminal identifier, a time stamp, a date stamp, or the like. In some embodiments, the merchant 108 may process the checkout token and the data associated with the transaction with a single device, such as a mobile point of sale device including devices that enable magnetic stripe and EMV (Eurocard, Mastercard, and Visa) translations to be performed such as devices from companies like PayPal, Square, Ingenico Verifone, and others, with multiple devices, or with a mobile device for person to person transactions, or the like.

The payment network 116 (or an acquirer processor or other entity associated with the payment network 116), analyzes data and/or message(s) sent from the merchant 108 and determines whether the data and/or message(s) should be routed to the transaction management system 130. This routing determination may be made at or by any of a number of different devices or entities, including, for example, at a payment terminal, at a retailer system (such as at the point of transaction, point of sale, or at a retailer payment switch), at a payment gateway, at a merchant processor system, at a payment network, or at a payment card issuer system (or any other system capable of reading information that would normally be passed on by the payment terminal to enable authorization of a payment transaction). In some embodiments, the routing determination may be made by the merchant 108, e.g., by consulting a BIN table or other routing table and comparing values in a BIN table or other routing table to values in the checkout token or other data that is communicated from the mobile device 102 along with the checkout token to the merchant 108.

After the transaction management system 130 receives the checkout token, the transaction management system 130 may attempt to match the checkout token with an existing identifier associated with an active mobile wallet session or may attempt to match the checkout token with a mobile wallet account. When a match occurs, the transaction management system 130 may then process a transaction. After the transaction has been processed, the transaction management system 130 may then send a transaction notification. The transaction notification may specify whether the transaction has been successfully or unsuccessfully processed.

In some embodiments, such as when the transaction management system 130 is unable to match the checkout token with an active session (or pending transaction record) or mobile wallet account, the transaction management system 130 may first determine if the checkout token received was a valid checkout token. In some embodiments, a checkout token's validity may be determined by looking at a number of data values that may include (but are not be limited to) the presence of the token in a list of issued and outstanding checkout tokens, determining if the checkout token had expired based on time to live values assigned to the token, the presence of a valid digital signature or other value created by the mobile device 102 and/or the merchant 108, the identity of the merchant 108, information identifying the mobile device 102 used in the transaction, the amount of the transaction, the time of day, a security profile associated with the merchant 108, a security profile associated with the device, and other factors and use restrictions.

Assuming that the checkout token was determined to be valid, the transaction management system 130 may authorize payment using a default payment credential, since the absence of an active session with the mobile device 102 may mean that the user would not be able to provide the transaction management system 130 with a payment selection in real time. One or more default payment instruments may be specified by the user as part of the signup process or default setting selection. Multiple default instruments might be specified, since some merchants might not accept the users "preferred" default instrument such as an American Express® card. In addition, the user might specify rules describing which payment instrument or instruments should be selected based on the amount of the purchase, the merchant, the instrument that maximizes loyalty points earned, the instrument that results in the lowest price for the user, or a number of other factors. These and other factors may be evaluated separately or in combination to come up with the best selection of payment instrument for the user. With this technique, a user might specify that if a gift card balance exists for a gift card that can be used for a particular transaction at a particular merchant, then the gift card balance should be exhausted with any remaining outstanding amount to be applied against the customer's preferred credit card. In this way, even without an active session and without interactively specifying which instruments to use to pay for a transaction, a split tender/multi-tender transaction can be completed.

In certain other embodiments, the user may select a payment credential or method via the mobile device 102. In such embodiments, the mobile device 102 may communicate the payment credential or method selected by the user to the merchant 108. The merchant 108 may then communicate the selection to the transaction management system 130.

Figure 2:
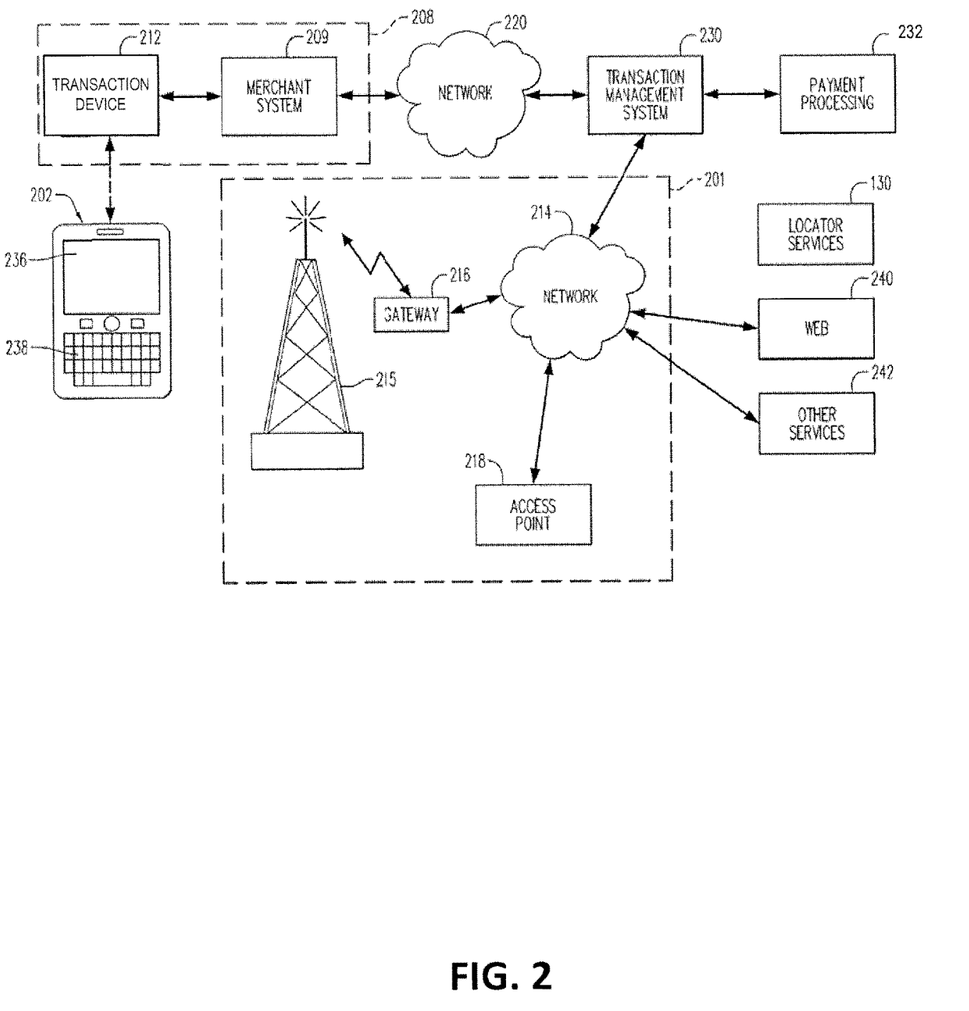
FIG. 2 is a block diagram showing further details of a payment system according to an embodiment of the disclosure.

Further details of the present invention may be described with reference to FIG. 2. FIG. 2 is a block diagram showing further details of a payment system according to an embodiment of the disclosure. The payment system of FIG. 2 includes a mobile device 202, a merchant 208, a transaction management system 230, and payment processing systems 232. The mobile device 202 may be similar to the mobile device 102 of FIG. 1. The mobile device 202 may be a mobile device having an RFID chip installed therein allowing the device to be operated pursuant to ISO/IEC 18092, NFC IP-1 or the ISO/IEC 14443 contactless communication standards, or other applicable contactless communication standards and wireless technologies including but not limited to those for Bluetooth and Bluetooth Low Energy (BLE) and NFC. Pursuant to some embodiments, mobile device 202 may operate a payment application allowing mobile device 202 to operate as a payment device as described herein.

Mobile device 202 may be configured to communicate over one or more wired and/or wireless networks 201. As an example, a wireless network may include a cellular network (represented by a cell transmitter 215). A mobile device 202 may communicate over a cellular or other wireless network and through a gateway 216 and then communicate with a network 214 (e.g., such as the Internet or other public or private network). An access point, such as access point 218 may be provided to facilitate data and other communication access to network 214. Access point 218 may be, for example, compliant with the 802.11 g, Bluetooth (or other) communication standards. For the purposes of this disclosure, the mobile device 202 may, in certain examples, be in an offline mode. In offline mode, the mobile device 202 may be unable to communicate with the networks 201.

Mobile device 202 may include a display screen 236 and a data entry device 238 (such as a keypad or touch screen, or voice interface). Pursuant to embodiments of the present invention, the customer may use the mobile device 202 to conduct a purchase transaction with a merchant 208. The merchant 208 may be similar to the merchant 108 of FIG. 1. In some embodiments, the mobile device 202 may also include a camera (not shown) or other image capture device which may allow the mobile device 202 to capture an image or representation of a checkout token. The mobile device 202 may also capture, obtain or generate a checkout token which may be communicated to a merchant 208 via wireless technologies such as NFC, Bluetooth, Bluetooth Low Energy, Wi-Fi, or audio.

The merchant 208 may operate one or more merchant systems 209 to process payments and transactions, including payment transactions pursuant to the present invention (as well as "traditional" or standard payment transactions involving cash, standard payment cards, or the like). The merchant system 209 may be a networked point of sale system (such as for a physical retail location) or it may be a shopping cart system (such as for an electronic commerce or Internet retail location). Merchant system 209 may be a combination of systems designed to allow a merchant to accept payments for goods or services. In some embodiments, merchant system 209 may be used in communication with one or more transaction devices 212 which may present and receive information from customers. For example, in the situation where the merchant 208 is a physical retail location, a merchant system 209 may be in communication with a number of different transaction devices 212, each of which may be located at a different checkout lane or location within the store (or in different stores in different geographical locations). Each of the transaction devices 212 may present, display, or communicate transaction information to customers at the point of sale so that the customer can approve or authorize purchases and present payment for the purchases. In certain embodiments, the transaction device 212 may include a Bluetooth, Bluetooth Low Energy, NFC, or other wireless communication module enabling communications between a mobile device 202 and transaction device 212.

As another example, where the merchant 208 is an Internet or other electronic commerce merchant, the merchant system 209 may be a Web server (or a network of servers, some of which may be Internet accessible) configured to process purchase transactions associated with merchant 208. Transaction device 212, in such an example, may be one or a number of remote terminals nearby the mobile device 202 that may interact with merchant system 209 such as, for example, personal computers, mobile devices, kiosks, automated teller machines, or the like that are able to interact with the merchant system 209 via a network such as the Internet.

In certain embodiments, either the mobile device 202 or the merchant 208 may initiate a transaction. The device initiating the transaction may then broadcast a transaction identifier that may include a service identifier indicating the identity or function (such as "checkout kiosk," "customer service device," or "mobile checkout device") of the device and a unique ID belonging to the device. The other device may then receive the transaction identifier and possibly confirm the transaction by, for example, confirming the transaction (through, for example, the transaction identifier) with the transaction management system 230. The transaction identifier may be any item that may identify the transaction. In certain embodiments, the transaction identifier may, for example, be separate from checkout tokens, but in other embodiments, the transaction identifier may be include checkout tokens or may be embedded within checkout tokens. Once the transaction has been confirmed, the mobile device 202 may then transmit a checkout token and, possibly, other data associated with the transaction to the transaction device 212.

After the merchant 208 receives the checkout token from the mobile device 202 (via the communications link between the mobile device 202 and the transaction device 212), the merchant 208 may transmit a merchant payment authorization request message to the transaction management system 230 over a network 220. The routing of the message to the transaction management system 230 may include mapping to or identifying the transaction management system 230 from information from within the checkout token.

In some embodiments, the merchant 208 and/or the transaction management system 230 (by way of a message routed through the merchant 208) may then transmit a customer payment confirmation request message to the customer's mobile device 202, enabling the customer to have a final opportunity to confirm or cancel the payment transaction. For example, the customer may be prompted to "confirm" or "cancel" the payment transaction. The prompt may provide additional information about the transaction and the selected payment account so the customer can have detailed information about the transaction before selecting "confirm" or "cancel." In some embodiments, customers may be given the opportunity to set preferences or otherwise configure the mobile payment application to enable or disable certain messages or transaction steps. As a specific example, customers may be given the opportunity to receive (or not receive) customer payment confirmation request messages.

Afterwards, the transaction management system 230 may create an authorization approval request message for transmission through one or more payment processing network(s) 232 to cause the authorization, clearing and settlement of funds for the transaction. This request message may include the transaction details, such as the amount of the transaction or other information, from the merchant payment authorization request (received from the merchant 208) and the actual payment credentials associated with the payment account selected by the customer. The actual payment credentials may be obtained by using the payment account selection information and performing a lookup of actual payment account credentials previously stored in a database or location accessible to the transaction management system 230. The authorization approval processing may be performed using standard financial authorization processing over one or more payment processing networks 232 (e.g., such as the VISANET® network operated by Visa, Inc., an Automated Clearing House system such as NACHA, PayPal®, or the like). Once the availability of funds is confirmed, the transaction management system may then send a merchant payment authorization response message to the merchant 208 so the transaction can be completed at the point of sale 212, and a customer payment authorization response message to the customer's mobile device 202.

Figure 3:
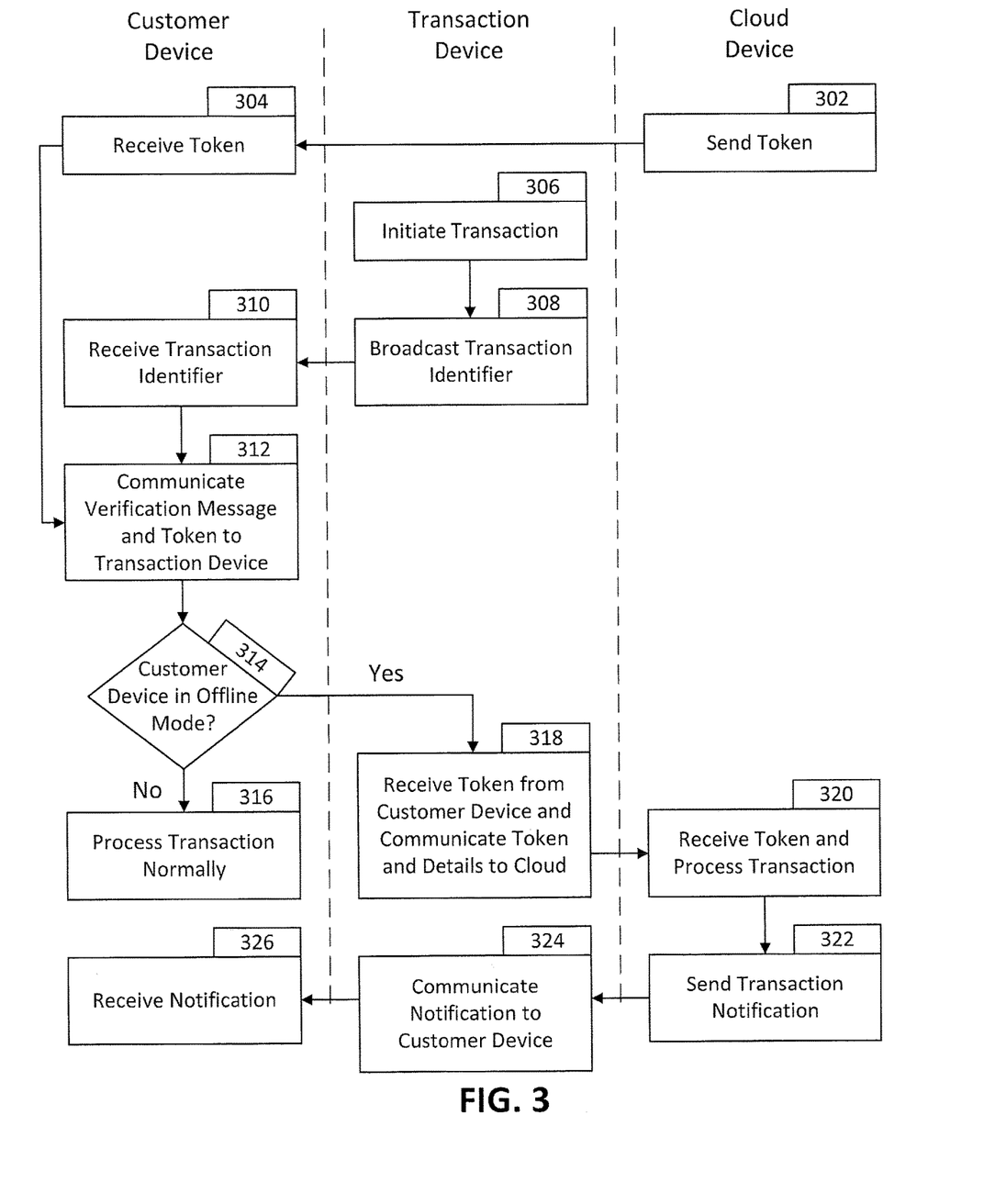
FIG. 3 is a flowchart showing fault tolerant mobile payment according to an embodiment of the disclosure.

The fault tolerant payment or transaction process performed by the systems described herein may be further illustrated in FIG. 3. FIG. 3 is a flowchart showing fault tolerant mobile payment according to an embodiment of the disclosure. For the purposes of this disclosure, a "fault tolerant payment process" may be a payment process where the mobile device may lose connection to the transaction management system, or may be a payment process where the mobile device has been placed in an offline mode. The process need not be limited to payment transactions, as other transactions involving token communications described herein may also be suitable, such as identity verification.

Figure 4:
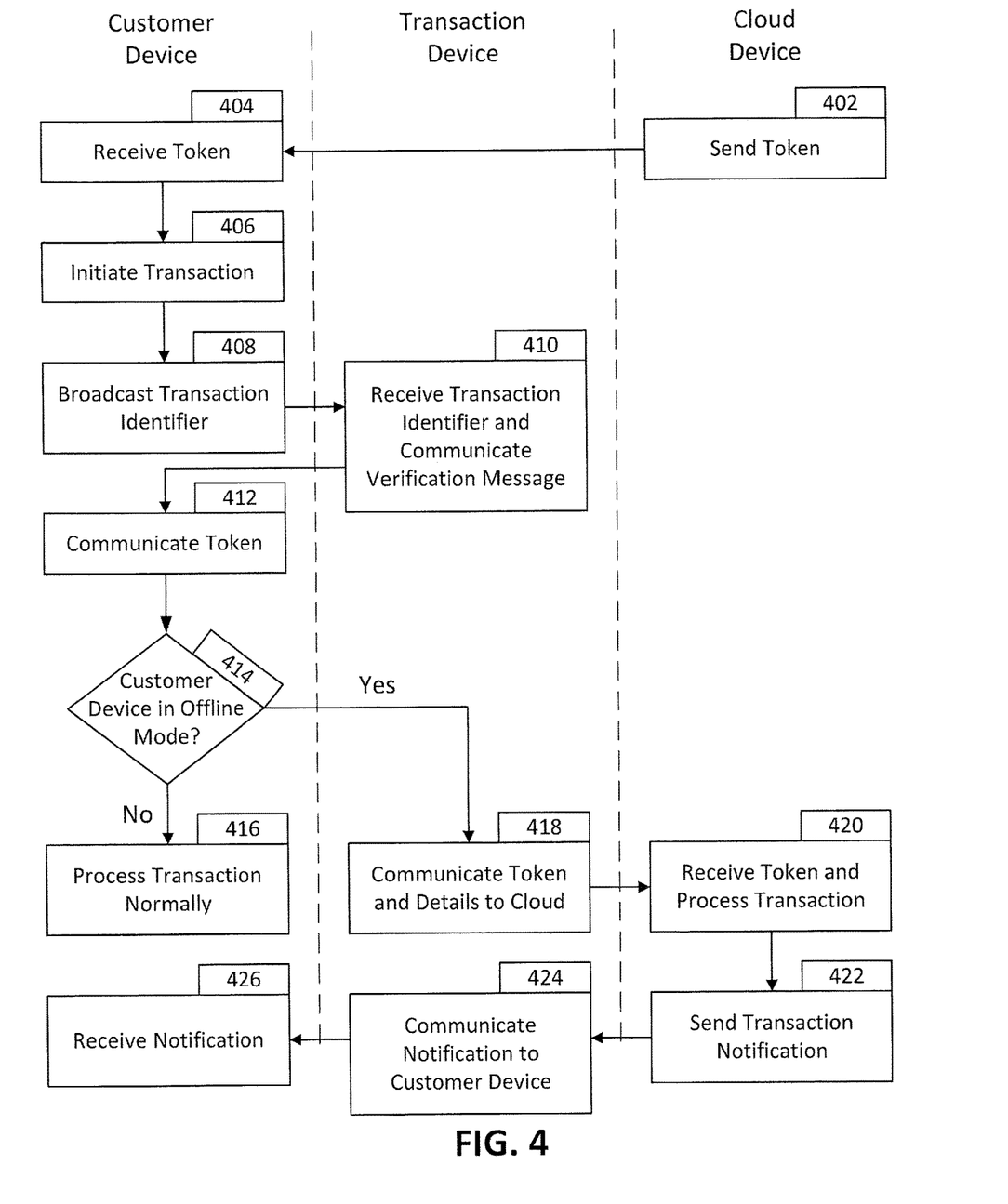
FIG. 4 is a flowchart showing another fault tolerant mobile payment according to an embodiment of the disclosure.

The flowchart of FIG. 3, as well as FIG. 4, divides the processes performed into customer device processes, transaction device processes, and cloud device processes. The customer device may be, for example, a mobile electronic device such as mobile device 102 or 202 of FIGS. 1 and 2. The transaction device may be, for example, the merchant 108 with the associated communications device 104 or the merchant 208 of FIGS. 1 and 2. The cloud device may include, for example, the payment network 116 and the transaction management system 130 of FIG. 1 or one, some, or all of the network 220, the transaction management system 230, and/or the payment processing networks 232 as well as associated communications components such as the wireless networks 201. It is appreciated that various embodiments may perform certain processes with a different component than that described herein. Thus, a process described as being performed by the customer device may be performed, in certain embodiments, by the transaction device and/or the cloud device.

The fault tolerant mobile payment process described in FIG. 3 may be a payment process transaction initiated by the transaction device. In block 302, the cloud device may communicate a checkout token to the customer device. The checkout token may be associated with a pending transaction or may be communicated in advance of a transaction.

In block 304, the customer device may receive the checkout token from the cloud device. The checkout token may be communicated and received in advance of a transaction. Checkout tokens communicated in advance of the transaction may be stored and managed by the customer device. The checkout tokens may be static tokens, the checkout tokens may be managed and there may be, in certain embodiments, token usage rules to govern a lifecycle of the checkout token. In certain embodiments, the checkout tokens may be stored with a secure checkout token storage strategy that may include usage rules for the checkout tokens as well as rules to limit liability of stolen or compromised checkout tokens.

In block 306, a transaction may be initiated by the transaction device. The transaction may be initiated according to a transaction with the customer, initiated by the customer device and/or the transaction device. The transaction initiation may be, for example, the scanning of a barcode of a product for sale, the entering of information of an item being bought, the adding to cart or checkout of an item on a kiosk or electronic device.

In block 308, the transaction device may broadcast a transaction identifier. The transaction identifier may, for example, include a combination of a service identifier identifying the type of device broadcasting the transaction identifier and a unique ID identifying the party that the device belongs to. Additionally, the transaction identifier may also contain information identifying the location of the transaction device, including, for example, a kiosk number, as well as information identifying the transaction itself, the amount of the transaction, items purchased by the transaction, and other information. In certain embodiments, the transaction identifier may include a prefix. The prefix may identify the type of device sending the transaction identifier. Transaction identifiers of other embodiments may include a checkout token that may be passed from the transaction device to the customer device. Such a checkout token may be received from the cloud device in response to the initiation of the transaction. In such an embodiment the processes of blocks 302 and 304 may be skipped.

In block 310, the transaction identifier may be received by the customer device. The customer device may then process the transaction identifier. For example, in certain embodiments, the transaction identifier, as well as other data, may be encrypted (e.g., through public key infrastructure "PKI", keyed-hash message authentication code "HMAC", or other encryption techniques) by the transaction device and/or the cloud device (for embodiments where the transaction identifier is first created by the cloud device and then communicated to the transaction device) and the customer device may receive the encrypted transaction identifier. The customer device, upon receiving the transaction identifier, may then process the transaction identifier by decrypting and/or validating (e.g., confirming that the transaction is a valid transaction or that the checkout token and/or the transaction identifier has not been tampered with) the transaction identifier. Other embodiments may decrypt and/or validate the checkout token and/or transaction identifier with the transaction device. Additionally, processing of the transaction identifier may include, for example, obtaining certain information from the transaction identifier and creating a verification message that may add information from the customer device to the information obtained from the transaction identifier. For example, certain embodiments may create a verification message that may combine information identifying the transaction (such as the transaction amount, the items or services involved in the transaction, or the time of transaction) included in the transaction identifier with, for example, information identifying the customer device (such as information as to the type of electronic device of the customer device and/or the identity of the electronic device itself). Other embodiments may create a verification message from other information. It is understood that for the purposes of this disclosure, the verification message may include any combination of information received by the customer device from the transaction device along with any data or information contained by the customer device.

In block 312, the verification message, along with the checkout token, may be communicated from the customer device to the transaction device. The checkout token may be the checkout token received from the cloud device in block 304, a checkout token broadcasted along with the transaction identifier in block 308, or a checkout token obtained from another source or obtained previous to the current transaction. Various embodiments of the customer device may maintain such checkout tokens until they are communicated to the transaction device in block 312.

In block 314, the software installed on the customer device may determine whether the customer device is in an offline mode. In offline mode, the customer device may be unable to communicate with, for example, the wireless networks 201 and/or the network 220, the transaction management system 230, and the payment processing systems 232. In various examples, the customer device may be in the offline mode due to a lack of network signal (e.g., lack of cellphone or data signal), due to the device being placed in an offline mode or mode where data may not be received (such as shutting off a data connection on the phone), or due to a personal choice by the customer to process the transaction via the offline mode. Software on the customer device may detect that it is in an offline mode by monitoring the status of its connection with the cloud device. For example, the customer device may attempt communication with the cloud device on a regular interval, and if it detects after a period of time that it cannot communicate with the cloud device, the customer device may make the determination that it is in offline mode until such time as communication with the cloud device can be re-established. Alternatively, the cloud device may be in session with the transaction device and may detect that it is unable to communicate with the customer device and thus determine that the customer device is in an offline mode. The cloud device may then communicate to the transaction device the determination that the customer device is in an offline mode. Additionally, in certain embodiments, the customer device, the transaction device, and/or the cloud device may determine that the customer device is in an offline mode at other parts of the transaction process (such as when the transaction is initiated). Other embodiments may skip block 314 entirely and may assume that the transaction is carried out in the offline mode. In such an embodiment, the customer device may automatically process the transaction in the offline mode may thus automatically proceed to block 318.

If the customer device is not detected to be in an offline mode in block 314, the process may proceed to block 316 and the transaction may proceed normally, e.g., with the customer device communicating, to the cloud device, the checkout token obtained from the transaction device. In such a situation, the customer device may communicate transaction information and/or the checkout token to the cloud device.

If the customer device is detected to be in an offline mode in block 314, the process may proceed to block 318. In block 318, the customer device may communicate the checkout token, as well as other transaction details, to the transaction device. The transaction device may then communicate the checkout token received from the customer device and details of the transaction, either received from the customer device and/or determined by the transaction device itself, to the cloud device. The token and transaction details may be sent as one message, or as multiple messages. In certain embodiments, the checkout token may be sent in a message separate from that of the transaction details. In other embodiments, the checkout token may include transaction details. The transaction details may include information received from the verification message. Examples of information that may be sent from the transaction device to the cloud device via the checkout token and/or the transaction information include information related to the identity of the customer device, information associated with the transaction (e.g., transaction amount, items and/or services involved in the transaction, the identity of the purchaser and/or seller, the geographical location of the purchaser, seller, and/or transaction, information related to the checkout token, and other information). Information may be communicated from the transaction device to the cloud device via, for example, the merchant device 209 and/or the network 220 of FIG. 2. Additionally, communications between the transaction device and the cloud device may also be via other devices and networks such as payment switches and merchant acquirers. While certain embodiments of the transaction device may communicate the checkout token obtained from the customer device to the cloud device in response to the determination that the customer device is in offline mode, other embodiments may communicate any checkout token obtained from the customer device to the cloud device regardless of customer device mode.

After block 318, the cloud device, in block 320, may receive the checkout token and transaction details and process the transaction via, for example, the transaction management system 130 of FIG. 1 or the transaction management system 230 and/or payment processing system 232 of FIG. 2. The transaction may be processed by, for example, using the checkout token and/or transaction details received to lookup the actual payment credentials associated with the account(s) identified. The actual payment credentials may be stored in a system accessible to the transaction management system 230. The actual payment credentials may be used to obtain payment transaction authorization from the appropriate payment network and/or financial institution. The appropriate payment network and/or financial institution may then provide a response that may include information as to whether the transaction was accepted or rejected.

The response of the payment network and/or financial institution may be sent as a transaction notification by the cloud device to the transaction device in block 322. The response may be sent through, for example, intermediaries such as point of sale devices, acquirers, networks, etc. that will link the cloud device to the transaction device. The transaction notification may include information as to whether the transaction was accepted or rejected. In certain embodiments, in block 324, the transaction device may communicate or forward the transaction notification to the customer device as the customer device, in offline mode, may be unable to receive notifications from the cloud device. The transaction notification may be received by the customer device in block 326. The customer device may then display the transaction notification on a user interface such as a display.

A fault tolerant payment process as described in FIG. 3 may be illustrated with the following example. Sean wants to purchase a video game and thus picks out a box containing the video game from within a store and brings the box to a checkout kiosk. The checkout kiosk may then scan a barcode located on the box to initiate the transaction. In this example, the transaction will be carried out through a payment app located on Sean's phone.

After the checkout kiosk has scanned the barcode located on the box, the checkout kiosk may broadcast a transaction identifier. The transaction identifier in this example may include a service identifier identifying the checkout kiosk and a unique merchant ID. The kiosk may be configured to broadcast the transaction identifier over Bluetooth, Bluetooth Low Energy, or another Bluetooth or other wireless communications standard. In this example, the kiosk may broadcast the transaction identifier over Bluetooth Low Energy and, though the payment app on Sean's phone had not yet been loaded prior to receiving the transaction identifier, upon detecting the broadcasting of the transaction identifier, Sean's phone may automatically load the payment app.

Sean's phone may receive the transaction identifier and the payment app on Sean's phone may then load and authenticate the transaction identifier and reply to the transaction device/kiosk with a verification message and a checkout token. The checkout token may be a checkout token that is stored on Sean's phone and has been managed by the payment app. The verification message may include information as to the identity of Sean's phone and details of Sean's payment app account. The verification message may be sent in a previously specified format, such as a DSSSID that may identify Sean's phone.

The kiosk may, after broadcasting the transaction identifier, listen for the verification message and the checkout token. In such a case, the kiosk may then receive the checkout token and the verification message. Once the kiosk receives the verification message and/or the checkout token, it may then match the information on the verification message and/or checkout token with information of an ongoing session (e.g., a "handshaking" session or process) with a customer device. The kiosk may thus match the information received with that of an ongoing transaction and verify that the customer device has approved of or agreed to the transaction.

Once the kiosk has matched the information received from the verification message and/or checkout token with an ongoing transaction, the kiosk may then send transaction details and the checkout token received from the customer device to a cloud device or server that may then process the session with the customer device. In this example, the servers receiving the transaction details and checkout token may be servers associated with PayPal®, which may offer mobile wallet payment services to users and clients.

Once the server has received the transaction details and checkout tokens, the server may then process the transaction by determining if there is a matching checkout token and/or transaction associated with the information received. The server may then confirm or reject the transaction and may send information specifying whether the transaction has been confirmed or rejected back to the kiosk via a transaction notification. Upon receiving the transaction notification, the kiosk may display visual notice of the transaction notification, such as a message stating "Transaction Successful" on a display or through the flashing of lights on the kiosk to denote success or failure of the transaction. In certain embodiments, the kiosk may then push the transaction notification to Sean's phone for Sean's phone to display. The payment app of Sean's phone may then store the transaction notification for future reference.

Fault tolerant mobile payments may also be performed in alternative process flows. Such an alternative process may be shown in FIG. 4. FIG. 4 is a flowchart showing another fault tolerant mobile payment according to an embodiment of the disclosure. The process illustrated in FIG. 3 may be a customer device initiated transaction process.

In blocks 402 and 404, the cloud device may send a checkout token and the customer device may receive the checkout token, respectively. Blocks 402 and 404 may be substantially similar to blocks 302 and 304 of FIG. 3, respectively.

In block 406, the customer device may initiate the transaction. The transaction may be initiated by the selection of a checkout option on the customer device, by the scanning of a barcode, Quick Response (QR) code, or other image, by selecting a purchase option on a user interface of the customer device, by a voice command from a user, or through another indication that a user may wish to initiate a transaction via the customer device.

In block 408, the customer device may broadcast a transaction identifier. The transaction identifier may, for example, include a combination of a service identifier identifying the type of device broadcasting the transaction identifier and a unique ID identifying the customer device, the party that the customer device belongs to, and/or an account related to the owner of the customer device. Additionally, the transaction identifier may also contain information identifying the location of the customer device, such as the global position or last known position of the customer device, as well as information identifying the transaction itself, the amount of the transaction, items purchased by the transaction, and other information. In certain embodiments, the transaction identifier may include a prefix and a DSSSID. The prefix may identify the type of device sending the transaction identifier and the DSSSID may identify the device. In certain embodiments, information identifying a customer device may have different formats from information identifying a transaction device. For example, an identification sequence of a prefix, DSSSID, or other information chain that identifies a transaction device may start with an "a" while a corresponding information sequence that identifies a customer device may start with a "b." Additionally, transaction identifiers may also include information embedded within a checkout token that may be passed from the customer device to the transaction device.

In block 410, the transaction identifier may be received by the transaction device. The transaction device may then process the transaction identifier by, for example, obtaining certain information from the transaction identifier and creating a verification message that may add information from the transaction device to the information obtained from the transaction identifier. For example, certain embodiments may create a verification message that may combine information identifying the transaction included in the transaction identifier with, for example, information identifying the transaction device (such as the merchant identity, the kiosk number, the location of the kiosk, the type of checkout device, or other information). Other embodiments may create a verification message from other information. It is understood that for the purposes of this disclosure, the verification message may include any combination of information received by the transaction device from the customer device along with any other data or information that the transaction device may possess.

After the customer device receives the verification message from the transaction device, the customer device may communicate the checkout token to the transaction device. In certain embodiments, the customer device may determine that the transaction device is the correct device before communicating the checkout token to the transaction device. The checkout token may be the checkout token received from the cloud device in block 404, a checkout token received along with the transaction verification in block 410, or a checkout token obtained from another source or obtained previous to the current transaction. As such, the checkout token from the cloud device may be communicated through a plurality of modes such as, for example, 1) where the checkout token from the cloud device is passed from the customer device to the transaction device and 2) where the checkout token from the cloud device is passed from the transaction device to the customer device. In the embodiment shown in FIGS. 3 and 4, the customer device may receive the checkout token ahead of the transaction and may be is cached ahead of time and/or retrieved in real time if there is good connectivity. In other embodiments, the customer device may, instead of receiving the checkout token from the cloud device in block 404, instead receive the checkout token from the transaction device. If the checkout token is a checkout token received along with the transaction verification in block 410, the transaction device may have received the checkout token from the cloud device after receiving the transaction identifier (e.g., by requesting a checkout token associated with the transaction from the cloud device) or may be a checkout token received from the cloud device prior to receiving the transaction identifier and managed by the transaction device (e.g., a "cached token mode"). The transaction device may maintain such checkout tokens until they are communicated to the customer device.

In block 414, the software installed on the customer device may determine whether the customer device is in an offline mode. Detecting whether the customer device is in an offline mode in block 414 may be substantially similar to that described for block 314.

If the customer device is not detected to be in an offline mode in block 414, the process may proceed to block 416 and the transaction may proceed normally. In such a situation, the customer device may communicate transaction information and/or the checkout token to the cloud device.

If the customer device is detected to be in an offline mode in block 414, the process may proceed to block 418. In block 418, the transaction device may communicate the checkout token received from the customer device and details of the transaction to the cloud device. Communication of the checkout token and the details of the transactions communicated to the cloud device in block 418 may be substantially similar to that described in block 318.

After block 418, the cloud device may receive the checkout token and transaction details and process the transaction in block 420. Block 420 may be substantially similar to block 320. Processing the transaction may include obtaining or attempting to obtain payment transaction authorization from the appropriate payment network and/or financial institution. The response of the payment network and/or financial institution may be sent as a transaction notification by the cloud device to the transaction device in block 422, which may be substantially similar to block 322. The transaction notification may include information as to whether the transaction was accepted or rejected. In block 424, the transaction device may communicate or forward the transaction notification to the customer device as the customer device, in offline mode, may be unable to receive notifications from the cloud device. The transaction notification may be received by the customer device in block 426. Blocks 424 and 426 may be similar to blocks 324 and 326 of FIG. 3.

Figure 5:
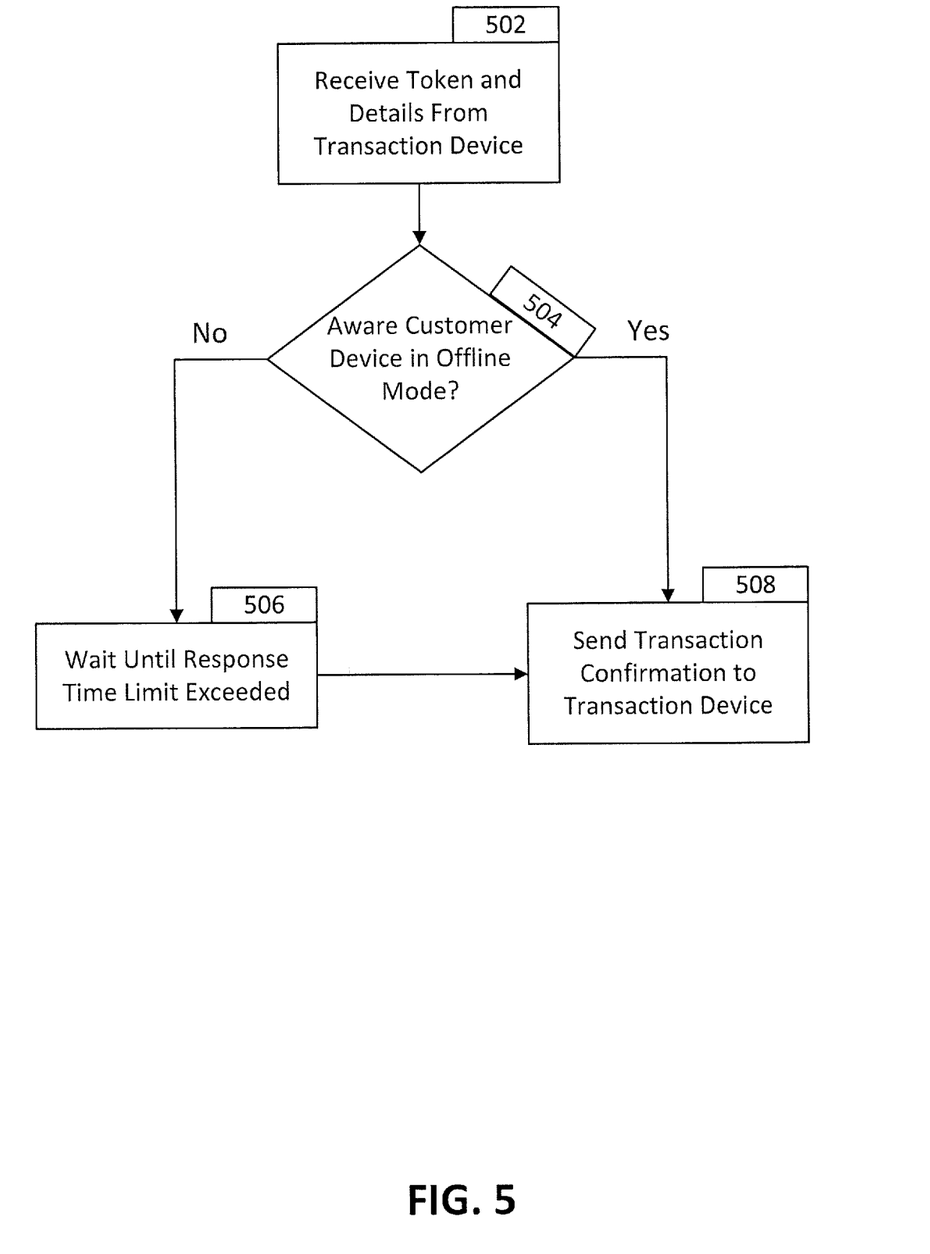
FIG. 5 is a flowchart showing fault tolerant payment processing according to an embodiment of the disclosure.

In certain embodiments, the cloud device may determine whether the customer device is in an offline mode. The cloud device may make this determination by, for example, the process illustrated in FIG. 5. FIG. 5 is a flowchart showing fault tolerant payment processing according to an embodiment of the disclosure.

In block 502 of FIG. 5, the checkout token may be received from the transaction device. Block 502 of FIG. 5 may correspond to blocks 320 and 420 of FIGS. 3 and 4, respectively. In block 504, the cloud device checks whether there is any indication that the customer device is in an offline mode. The indication may be from, for example, communications received from the transaction device (such as the checkout token and/or the transaction details received in block 502).

If the cloud device is not aware that the customer device is in an offline mode, the process may advance to block 506. In block 506, the cloud device may detect that the customer device is in an offline mode. The cloud device may detect that the customer device is in an offline mode due to the cloud device being unable to communicate with the customer device. For example, the cloud device may, upon receiving the checkout token and/or transaction details from the merchant device, commence tracking a response time. The response time may be an amount of time elapsed after receiving the checkout token and/or transaction details from the merchant device. The cloud device may track the response time and, when the amount of elapsed time has exceeded a response time limit, the cloud device may then determine that the customer device is in an offline mode.

Once the cloud device has determined that the customer device is in an offline mode, whether in block 506 or earlier, the cloud device may then send a transaction notification to the transaction device in block 508. The transaction notification sent in block 508 may be similar to the transaction notifications sent in blocks 322 and 422 of FIGS. 3 and 4, respectively.

Figure 6:
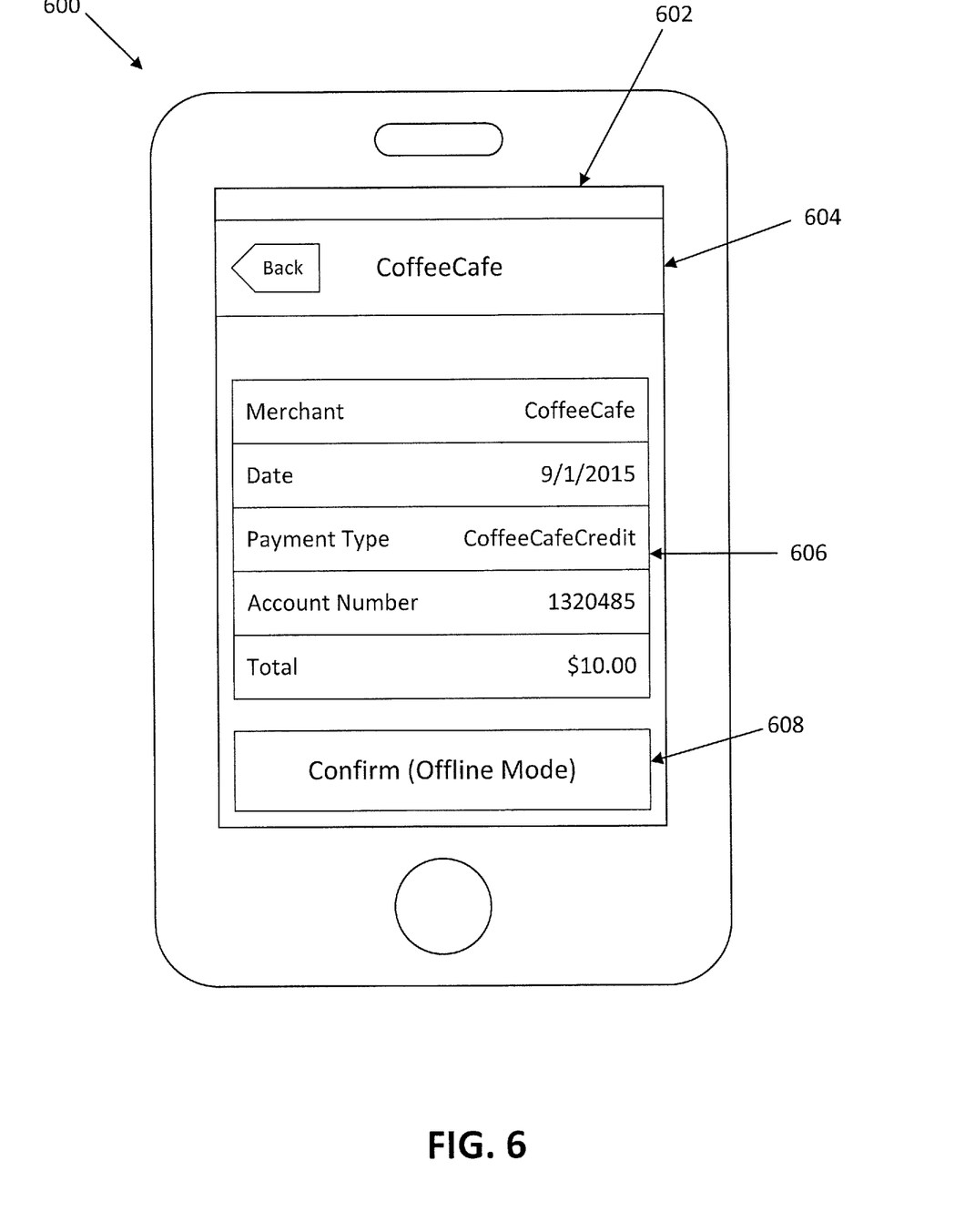
FIG. 6 shows a user interface according to an embodiment of the disclosure.

The customer device described herein may include a user interface that allows a user to initiate or perform certain steps within the transaction. FIG. 6 shows a user interface according to an embodiment of the disclosure.

The customer device 600 of FIG. 6 may include a user interface 602. The user interface 602 may display a confirmation page that may include a transaction title 604, a transaction summary 606, and a confirmation button 608. The transaction title 604 may include information related to the merchant (such as the name of the merchant) as well as an option to cancel the transaction or scroll back to another page. The transaction summary 606 may include information related to the transaction, including information related to the merchant, the transaction date, the transaction type, any payment accounts involved in the transaction, the transaction total, the items purchased, the time of purchase, any discounts, and other information that may be relevant to the transaction. The confirmation button 608 may be a button that may allow the user to confirm the transaction. After the user has pressed the confirmation button 608, a purchase transaction may then be initiated or confirmed by the user.

In certain embodiments, the user interface may provide an indication that the transaction is being conducted in an offline mode. For example, the transaction title 604, the transaction summary 606, and/or the transaction button 608 may include such an indication. In the example of FIG. 6, the transaction button 608 includes an indication that the transaction is being performed in an offline mode.

Figure 7:
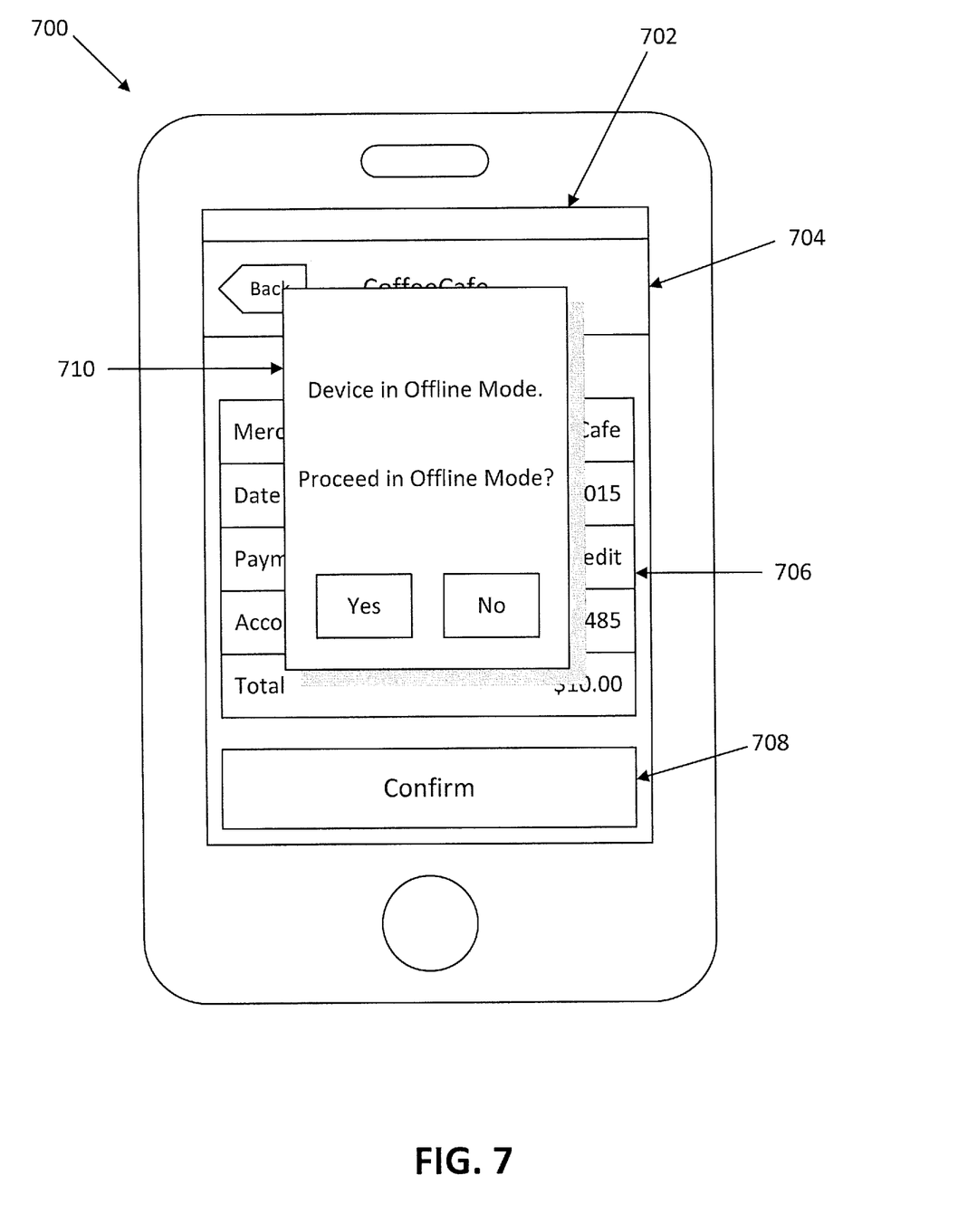
FIG. 7 shows a further user interface according to an embodiment of the disclosure.

The process and techniques disclosed herein may be performed through other configurations of user interfaces. FIG. 7 shows a further user interface according to an embodiment of the disclosure. The user interface configuration shown in FIG. 7 may be used as an alternative to the user interface configuration of FIG. 6.

The customer device 700 of FIG. 7 may include a user interface 702. The user interface 702 may display a confirmation page that may include a transaction title 704, a transaction summary 706, a confirmation button 708, and a confirmation window 710. The transaction title 704, the transaction summary 706, and the confirmation button 708 may be similar to the transaction title 604, the transaction summary 606, and the transaction button 608, respectively, of FIG. 6.

In FIG. 7, the transaction button 708 may not include an indication that the customer device is in an offline mode. Instead, for the customer device 700 of FIG. 7, the customer device may determine that the transaction will be performed in an offline mode after the transaction has been confirmed by the user. The customer device may then display the confirmation window 710 and ask the user to confirm the processing of the transaction in offline mode. After the user has given his or her confirmation, purchase transaction may then be initiated or confirmed. In other embodiments, the customer device may automatically detect that it is in an offline mode and may process the transaction accordingly without notifying the user that it is in the offline mode.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A merchant Point-of-Sale (PoS) device for using electronic tokens to process transactions via multiple communication networks comprising:
a non-transitory memory storing instructions; and
a processor configured to execute the instructions to cause the merchant PoS device to perform operations comprising:
initiating a transaction with a user device based on an interaction of the user device with the merchant PoS device over a first network;
communicating, over a second network, with a transaction management system and determining that the user device is in an offline mode based on an elapsed time waiting for a response from the user device exceeding a response time limit, wherein the offline mode indicates an inability for the user device to connect to the transaction management system via the second network;
obtaining an electronic token from the user device over the first network, wherein the electronic token indicates at least details of the transaction, and wherein the electronic token was previously provided to the user device when the user device was in an online mode;
in response to the determining that the user device is in the offline mode, communicating, over the second network, the electronic token and data associated with the transaction to the transaction management system for the processing of the transaction;
receiving, from the transaction management system and over the second network, a transaction notification that indicates that the transaction management system has processed the transaction using the electronic token and data associated with transaction and obtained a payment authorization from a payment network; and communicating the transaction notification to the user device over a second first network.

2. The merchant PoS device of claim 1,
wherein the determining that the user device is in the offline mode is further based on receiving a customer device offline indication from the transaction management system.

3. The merchant PoS device of claim 1, wherein operations further comprise:
generating a transaction identifier; and
broadcasting the transaction identifier to the user device over the first network,
wherein:
a transaction message received from the user device is a verification message from the user device provided based on receiving the transaction identifier, and
the verification message comprises the data and information identifying the user device comprising a user device identifier and location information of the user device.

4. The merchant PoS device of claim 1, wherein the operations further comprise scanning a QR code of a product or a service associated with the transaction from a display of the user device.

5. The merchant PoS device of claim 1, wherein the first network comprises a Bluetooth, near field communication, or Wireless Fidelity (WiFi) based communications network.

6. The merchant PoS device of claim 1, wherein the operations further comprise indicating, to the transaction management system, that the user device is in the offline mode and that the merchant PoS device will facilitate the processing of the transaction.

7. A method comprising:
responsive to receiving a transaction initiation notification for a transaction with a customer device, initiating the transaction at a merchant device;
receiving, from the customer device and over a first network, a transaction message comprising data associated with the transaction, wherein the first network is a short range wireless communications network;
receiving, over the first network, a token from the customer device, the token at least indicating details of the transaction and the token was provided to the customer device during a period when the customer device was in an online mode prior to the initiating the transaction;
responsive to receiving the token, determining, through communications between the merchant device and a cloud device over a second network, that the customer device is in an offline mode based on an elapsed time that the cloud device waited to receive a response from the customer device exceeding a response time limit that indicates that the customer device is unable to communicate the token to the cloud device for completion of the transaction;
responsive to determining that the customer device is in the offline mode, determining to complete the transaction at the merchant device;
responsive to determining to complete the transaction at the merchant device, communicating the token and the data associated with the transaction to the cloud device over the second network for the completion of the transaction;
receiving a transaction notification from the cloud device over the second network, wherein the transaction notification indicates that the cloud device has processed the transaction using the token and obtained a payment authorization from a payment network based on the token and the data associated with the transaction; and
communicating the transaction notification to the customer device over the first network.

8. The method of claim 7, further comprising receiving, at the merchant device, a customer device offline indication from the cloud device over the second network.

9. The method of claim 7, further comprising:
generating a transaction identifier; and
broadcasting the transaction identifier to the customer device over the first network,
wherein:
a transaction message received from the customer device is a verification message provided based on receiving the transaction identifier, and
the verification message comprises information identifying the customer device comprising a customer device identifier and location information of the customer device.

10. The method of claim 9, wherein the transaction initiation notification comprises an indication of a scanning or entering of a product identifier, for a product or service associated with the transaction, at the customer device or at the merchant device.

11. The method of claim 7, further comprising:
further responsive to determining that the customer device is in the offline mode, indicating, to the cloud device, that the customer device is in the offline mode and that the merchant device will complete the transaction.

12. The method of claim 7, wherein the first network comprises a Bluetooth, near field communication, scanning of one or more QR codes, or a Wireless Fidelity (WiFi) based communications network.

13. A non-transitory machine-readable medium having instructions stored thereon, the instructions executable to cause a merchant device to perform operations comprising:
in response to receiving a transaction indication for a transaction with a user device, initiating a transaction at the merchant device
obtaining, at the merchant device over a first network, a checkout token from a user device, the checkout token comprising details of the transaction;
in response to obtaining the checkout token, determining, through communications with a cloud device over a second network, that the user device is in an offline mode based on an elapsed time that the cloud device waited to receive a response from the user device exceeding a response time limit indicating that the user device is unable to communicate with the cloud device over to complete the transaction;
in response to determining that the user device is in the offline mode, determining, at the merchant device, to complete the transaction by communicating with the cloud device over the second network;
in response to determining to complete the transaction at the merchant device, communicating, over the second network, the checkout token and a data to the cloud device to complete the transaction;
receiving, from the cloud device over the second network after the communicating the checkout token, a transaction notification generated by the cloud device indicating processing of the transaction and a payment authorization; and
communicating the transaction notification to the user device over the first network.

14. The non-transitory machine-readable medium of claim 13, wherein the transaction indication comprises a transaction message that is received from the user device, wherein the transaction message comprises the checkout token, and wherein said obtaining the checkout token comprises accessing the transaction message.

15. The non-transitory machine-readable medium of claim 13, wherein the transaction indication comprises an indication of a scanning or entering of a product identifier, for a product or service associated with the transaction, at the user device or at the merchant device.

16. The non-transitory machine-readable medium of claim 13, wherein the operations further comprise, further responsive to determining that the user device is in the offline mode, indicating, to the cloud device, that the user device is in the offline mode and that the merchant device will complete the transaction.

17. The non-transitory machine-readable medium of claim 16, wherein the operations further comprise:
generating a transaction identifier; and
broadcasting the transaction identifier to the user device over the first network,
wherein:
a transaction message is a verification message received from the user device that is provided based on receiving the transaction identifier, and
the verification message comprises information identifying the user device comprising a user device identifier and location information of the user device.

18. The non-transitory machine-readable medium of claim 13, wherein said determining that the user device is in the offline mode is further based on
receiving a user device offline indication from the cloud device over the second network.

19. The non-transitory machine-readable medium of claim 13, wherein the first network comprises a Bluetooth, near field communication, scanning one or more QR codes, or Wireless Fidelity (WiFi) based communications network.

20. The non-transitory machine-readable medium of claim 13, wherein the details of the transaction include at least an amount for the transaction.

* * * * *

UNITED STATES PATENT AND TRADEMARK OFFICE
CERTIFICATE OF CORRECTION

PATENT NO. : 11,049,096 B2  
APPLICATION NO. : 14/986416  
DATED : June 29, 2021  
INVENTOR(S) : Max Metral et al.

Page 1 of 1

It is certified that error appears in the above-identified patent and that said Letters Patent is hereby corrected as shown below:

In the Claims

At Column 17, Line 5: Please replace "and communicating the transaction notification to the user device over a second first network" with "and communicating the transaction notification to the user device over the first network"

Signed and Sealed this  
First Day of March, 2022

Drew Hirshfeld  
*Performing the Functions and Duties of the*  
*Under Secretary of Commerce for Intellectual Property and*  
*Director of the United States Patent and Trademark Office*